United States Patent
Forcash (10) Patent No.: US 12,535,816 B2
(45) Date of Patent: Jan. 27, 2026

(54) SYSTEM AND METHOD FOR REDUCING CARGO DAMAGE OF LOADING MACHINE

(71) Applicant: Caterpillar Inc., Peoria, IL (US)

(72) Inventor: Joseph E. Forcash, Clayton, NC (US)

(73) Assignee: Caterpillar Inc., Irving, TX (US)

( * ) Notice: Subject to any disclaimer, the term of this patent is extended or adjusted under 35 U.S.C. 154(b) by 409 days.

(21) Appl. No.: 18/168,317

(22) Filed: Feb. 13, 2023

(65) Prior Publication Data

US 2024/0272638 A1    Aug. 15, 2024

(51) Int. Cl.
  *G05D 1/00* (2024.01)
  *B66F 9/075* (2006.01)

(52) U.S. Cl.
  CPC ......... *G05D 1/0223* (2013.01); *B66F 9/0755* (2013.01); *G05D 1/0274* (2013.01)

(58) Field of Classification Search
  None
  See application file for complete search history.

(56) References Cited

U.S. PATENT DOCUMENTS

| | | |
|---|---|---|
| 9,523,180 B2 | 12/2016 | Deines |
| 10,479,354 B2 | 11/2019 | Posselius et al. |
| 2010/0268410 A1* | 10/2010 | Vigholm ............... E02F 9/2217 701/31.4 |
| 2011/0060478 A1* | 3/2011 | Nickolaou ............ G01S 17/931 701/1 |
| 2016/0334798 A1* | 11/2016 | Foster .................. A01B 69/008 |
| 2017/0298591 A1* | 10/2017 | Imaizumi ............. E02F 9/2296 |
| 2020/0299923 A1* | 9/2020 | Enomoto ................ F16D 25/00 |
| 2020/0310442 A1 | 10/2020 | Halder et al. |

FOREIGN PATENT DOCUMENTS

| IN | 973KO2012 A | 10/2015 |
|---|---|---|
| JP | 2019167029 A | * 10/2019 |

OTHER PUBLICATIONS

Espacenet English Translation of JP-2019167029-A (Year: 2019).*

* cited by examiner

*Primary Examiner* — James J Lee
*Assistant Examiner* — Andrew Sang Kim (57) ABSTRACT

A system for adjusting parameters on a machine that operates at least semi-autonomously and includes a lifting tool to lift or tilt a load. The system includes: an accelerometer, a rotational sensor, a positioning receiver, a level actuator and a tilt actuator to adjust a level and a tilt of the lifting tool, respectively, a speed control system to adjust a speed of the machine; and a controller on the machine to: access a terrain roughness threshold and a worksite map that includes terrain roughness data, receive data from the accelerometer and the rotational sensor, determine a current location of the machine, terrain roughness, whether the terrain roughness exceeds the terrain roughness threshold, and whether the machine is in a load-carrying phase of operation, and reduce the speed of the machine when the terrain roughness exceeds the terrain roughness threshold and the machine is in the load-carrying phase.

24 Claims, 5 Drawing Sheets

SYSTEM AND METHOD FOR REDUCING CARGO DAMAGE OF LOADING MACHINE

TECHNICAL FIELD

This disclosure relates generally to a system, a method, and an at least semi-autonomous machine (that is, an autonomous or a semi-autonomous machine) for reducing damage to cargo as the cargo is picked up at a loading location, transported over rough terrain to a second location, and unloaded at a target location.

BACKGROUND

Machines may be used at worksites to pick up, transport, and deposit various types of materials and cargo. Some of what may be transported may be fragile, or at least capable of being exposed to forces that could damage the material or cargo during transport. Among the reasons for damaged material, operator error is high on the list. Damaged material may also be due to lack of training, lack of motivation to provide quality results, and the like.

An example of when damage to cargo or materials may occur during transport is at a solar farm installation. In an example, an earth moving machine with forks, such as a compact track loader (CTL) or a wheel loader, is used to pick up loads of solar panels at a loading location and transport them to various target locations (or areas) at the worksite. The CTL may be operated manually, semi-autonomously, or autonomously. The terrain at the worksite may be rough, perhaps rough in only some areas while relatively smooth in others.

In some instances, solar panels may be damaged while the CTL is moving them around the worksite. A need exists to transport cargo and materials at a worksite with reduced damage.

U.S. Pat. No. 9,523,180 discloses a semi-automatic material loading device (or loader). The loader includes forks that is controlled by a set of actuators. The actuators can include lift and tilt actuators that can be used to position the forks. A vehicle control system can receive sensor inputs indicative of one or more conditions and parameters, so that a semi-automatic dumping control system can automatically control the position of the forks. Further, when it is determined that the loading device is carrying material, automatic positioning of the loading device is enabled. Moreover, the patent also discloses that the vehicle control system includes a traction control system which can control the wheels or tracks to move the vehicle at a desired speed.

The foregoing background discussion is intended solely to aid the reader. It is not intended to limit the innovations described herein, not to limit or expand the prior art discussed. Thus, the foregoing discussion should not be taken to indicate that any particular element of a prior system is unsuitable for use with the innovations described herein, nor is it intended to indicate that any element is essential in implementing the innovations described herein. The implementations and application of the innovations described herein are defined by the appended claims.

BRIEF SUMMARY

One or more embodiments of the present disclosure provides a system for adjusting parameters on a machine that operates at least semi-autonomously at a worksite and comprises a lifting tool configured to lift and/or tilt a load. The system includes: a plurality of sensors disposed on the machine, the plurality of sensors comprising: an accelerometer configured to measure linear acceleration of the machine in at least one direction; and a rotational sensor configured to measure rotation and/or rate of rotation of the machine about at least one axis; a positioning receiver disposed on the machine and configured to receive positioning signals from a positioning system; a plurality of actuators disposed on the machine, the plurality of actuators comprising: a level actuator configured to adjust a level of the lifting tool; a tilt actuator configured to adjust a tilt of the lifting tool; and a speed control system configured to adjust a speed of the machine; and a controller disposed on the machine and configured to: access a terrain roughness threshold; access a map of the worksite, the map comprising terrain roughness data; receive measurement data from at least one of the accelerometer and the rotational sensor; determine, using position data from the positioning receiver, a current location of the machine; determine terrain roughness using at least one of accelerometer data, rotational sensor data, and the map combined with the current location; determine whether the terrain roughness exceeds the terrain roughness threshold; determine whether the machine is in a load-carrying phase of machine operation at the worksite in an operating cycle of the machine based on the current location of the machine, level and/or tilt data from a work tool position sensor; and reduce the speed of the machine when the terrain roughness exceeds the terrain roughness threshold and the machine is in the load-carrying phase.

One or more embodiments of the present disclosure provides a method of operating a machine at a worksite. The machine includes: a lifting tool configured to lift and tilt a load; a system for automatically adjusting parameters on the machine, the system comprising: a plurality of sensors comprising: an accelerometer configured to measure linear acceleration of the machine in at least one direction; a rotational sensor configured to measure rotation and/or rate of rotation of the machine about at least one axis; a level sensor configured to measure a level of the lifting tool relative to a plane of reference on the machine; a tilt sensor configured to measure a tilt of the lifting tool relative to the plane of reference; a positioning receiver configured to receive positioning signals from a plurality of transmitters of at least one positioning system; a plurality of actuators disposed on the machine, the plurality of actuators comprising: a level actuator configured to adjust the level of the lifting tool; a tilt actuator configured to adjust the tilt of the lifting tool; a ride control system configured, when enabled, to increase a level of suspension of the machine; a speed control system configured to adjust a speed of the machine; a controller operationally connected to the plurality of sensors, the positioning receiver, and the plurality of actuators; the method comprising: accessing a map of the worksite, the map comprising terrain roughness data; receiving measurement data from the plurality of sensors; determining, using position data from the positioning receiver, a current location of the machine; determining terrain roughness using accelerometer data, rotational sensor data, and/or the map combined with the current location; adjusting the speed based on terrain roughness by actuating the speed control system, with the limitation that the speed is less than or equal to a preset maximum speed; determining a current phase in an operating cycle of the machine based on the current location of the machine, data from the level sensor, and/or data from the tilt sensor; adjusting, based on the current phase, the level and the tilt by actuating the level actuator and the tilt actuator, respectively; and enabling or disabling, based on the current phase, the ride control system.

One or more embodiments of the present disclosure provides an at least semi-autonomous machine configured to operate at a worksite and including a lifting tool configured to lift and/or tilt a load and a system for automatically adjusting parameters on the machine. The system includes: a plurality of sensors comprising: an accelerometer configured to measure linear acceleration of the machine in at least one direction; a rotational sensor configured to measure rotation and/or rate of rotation of the machine about at least one axis; a level sensor configured to measure a level of the lifting tool relative to a plane of reference on the machine; a tilt sensor configured to measure a tilt of the lifting tool relative to the plane of reference; a positioning receiver configured to receive positioning signals from a plurality of transmitters of at least one positioning system; a plurality of actuators disposed on the machine, the plurality of actuators comprising: a level actuator configured to adjust the level of the lifting tool; a tilt actuator configured to adjust the tilt of the lifting tool; a ride control system configured, when enabled, to increase a level of suspension of the machine; a speed control system configured to adjust a speed of the machine; a controller operationally connected to the plurality of sensors, the positioning receiver, and the plurality of actuators, the controller being configured to: access a map of the worksite, the map comprising terrain roughness data; receive measurement data from the plurality of sensors; determine, using position data from the positioning receiver, a current location of the machine; determine terrain roughness using accelerometer data, rotational sensor data, and/or the map combined with the current location; adjust the speed based on terrain roughness by actuating the speed control system, with the limitation that the speed is less than or equal to a preset maximum speed; determine a current phase in an operating cycle of the machine based on the current location of the machine, data from the level sensor, and/or data from the tilt sensor; adjust, based on the current phase, the level and the tilt by actuating the level actuator and the tilt actuator, respectively; and enable or disable, based on the current phase, the ride control system.

DETAILED DESCRIPTION

The present disclosure is directed to a system, a method, and an at least semi-autonomous machine that loads, unloads, and transports cargo. The disclosure provides for reducing damage to cargo moved by the machine by automatically adjusting parameters of operation such as speed, ride control, tilt and level of the lifting tool, where the lifting tool, a type of work tool, is the portion of the machine that actually carries the cargo or material being transported at the worksite.

Damage-free transport of solar panels may require the CTL to travel relatively slowly. When rough terrain is encountered, even more care and lower speeds may be required. Further, while transporting a load, the lifting tool (for example, forks or a bucket on the CTL) must be lifted to the proper height and tilted to the proper angle. Further, in some instances, ride control may be used to better cushion the solar panels as they are being transported.

A semi-autonomous (or autonomous) CTL may reduce damage by identifying the particular phase in an operating cycle and adjusting operating characteristics accordingly. The operating cycle includes loading a load (for example, picking up a pallet) at a loading location, transporting the load (load carrying) from the loading location to a target location, unloading the load (for example, dropping off the pallet) at the target location, and returning from the target location to the loading location. The semi-autonomous CTL can also learn where rough terrain is and adjust speed and ride control as needed.

Figure 1:
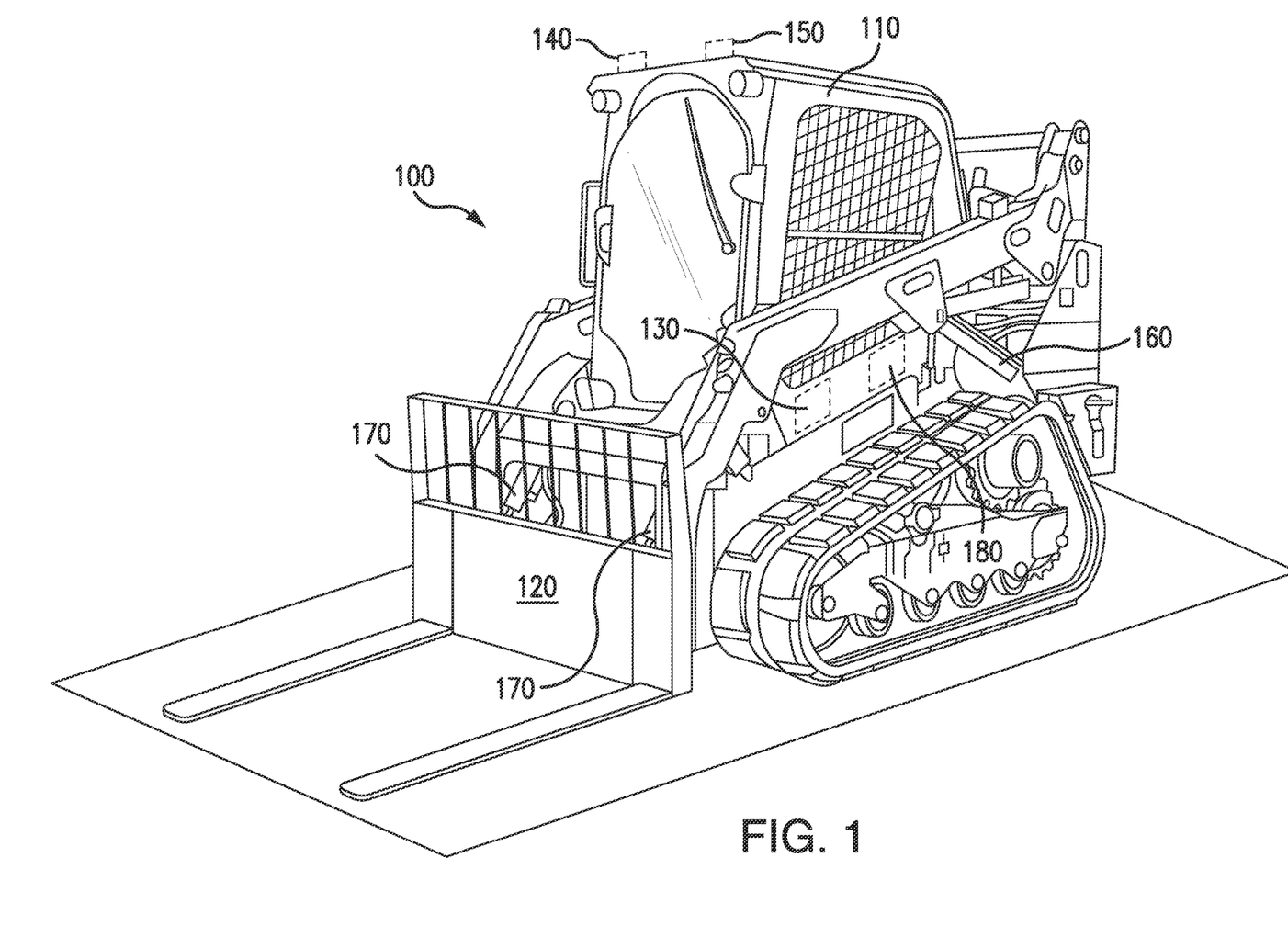
FIG. 1 depicts a semi-autonomous machine in accordance with one or more embodiments.

FIG. 1 shows a CTL 100 that may be manually controlled, semi-autonomous, or autonomous. If semi-autonomous, an operator may be physically in the operator station, or cab, 110 of the machine 100 or may be remotely controlling the machine 100. Remote control may be performed at the worksite or off-site. Remote control may be performed using a hand-held remote console, a remote station that is set up much like the physical cab of the machine, or the like.

Machines that are at least semi-autonomous include a variety of machines known in the art. While a CTL is used herein as a non-limiting exemplary embodiment, other embodiments are contemplated including trackless vehicles (for example, those with wheels) and machines of differing sizes, not just those considered compact. Further, the forks 120 in the example may be replaced by forks and other means of lifting and transporting a load. In the present disclosure, forks, buckets, and the like may be referred to as a lifting tool.

Sensors 130 may disposed in various locations on the machine 100 as suited to perform their various measurements. In FIG. 1, the sensors 130 are represented by a generic dashed box to represent their presence on the machine without limiting them to any specific location. Sensors 130 may be used to measure pressure, force, strain, load, temperature, speed, acceleration, rotation, rate of rotation, and the like. Sensors 130 may be associated with ambient measurements, internal combustion engines, electric motors, actuators, hydraulics, the load, and the like. These sensors are described in greater detail below.

Environmental sensors 140 may be used to provide measurements of the environment around the machine 100. These environmental sensors 140 may include radar, LIDAR (light detection and ranging), machine vision, ultrasound, and the like. These sensors may be used to determine location, identify obstacles and personnel to be avoided, rough terrain, and other features like these.

The machine 100 may also include a positioning receiver 150 disposed on the machine and configured to receive positioning signals from a plurality of transmitters of at least one positioning system, sometimes referred to as a position, navigating, and timing (PNT) system. The positioning receiver 150 is configured to receive a signal from a plurality of positioning transmitters from one or more positioning systems. The positioning system may be a local, regional, or global navigation satellite system (GNSS).

A local positioning system (LPS) provides positioning using line-of-sight reception of signals transmitted from three or more beacons whose locations are known precisely. Radio broadcast towers, cellular base stations, Wi-Fi, LiFi (a visible light communications system), and the like may serve as beacons for a local system.

A regional system allow a two-dimensional (2-D) determination of position in a limited region that is larger than a local system. An example of a regional system is a LORAN system.

A GNSS uses positioning signals broadcast from satellites to provide a three-dimensional (3-D) position plus time to a positioning receiver 150. Examples of GNSS include the global positioning system (GPS), the Russian Global Navigation Satellite System (GLONASS) and the European system, Galileo.

Referring again to FIG. 1, the machine 100 uses actuators such as hydraulic cylinders to perform various functions. Lift actuators 160 are used to lift the forks 120, while tilt actuators 170 are used to tilt the forks 120 to more securely carry its cargo or material load.

The machine 100 may also include a controller 180, shown here to be disposed on the machine 100 at a location that is suitable. The controller 180 is configured to be operatively connected to sensors 130, 140, the positioning receiver 150, and actuators 160, 170. The controller 180 may receive sensor data (for example, measurements) from the sensors 130, 140 and may actuate, control, and enable various actuators 160, 170 and similar features. The controller may be an engine control module (ECM).

Figure 2:
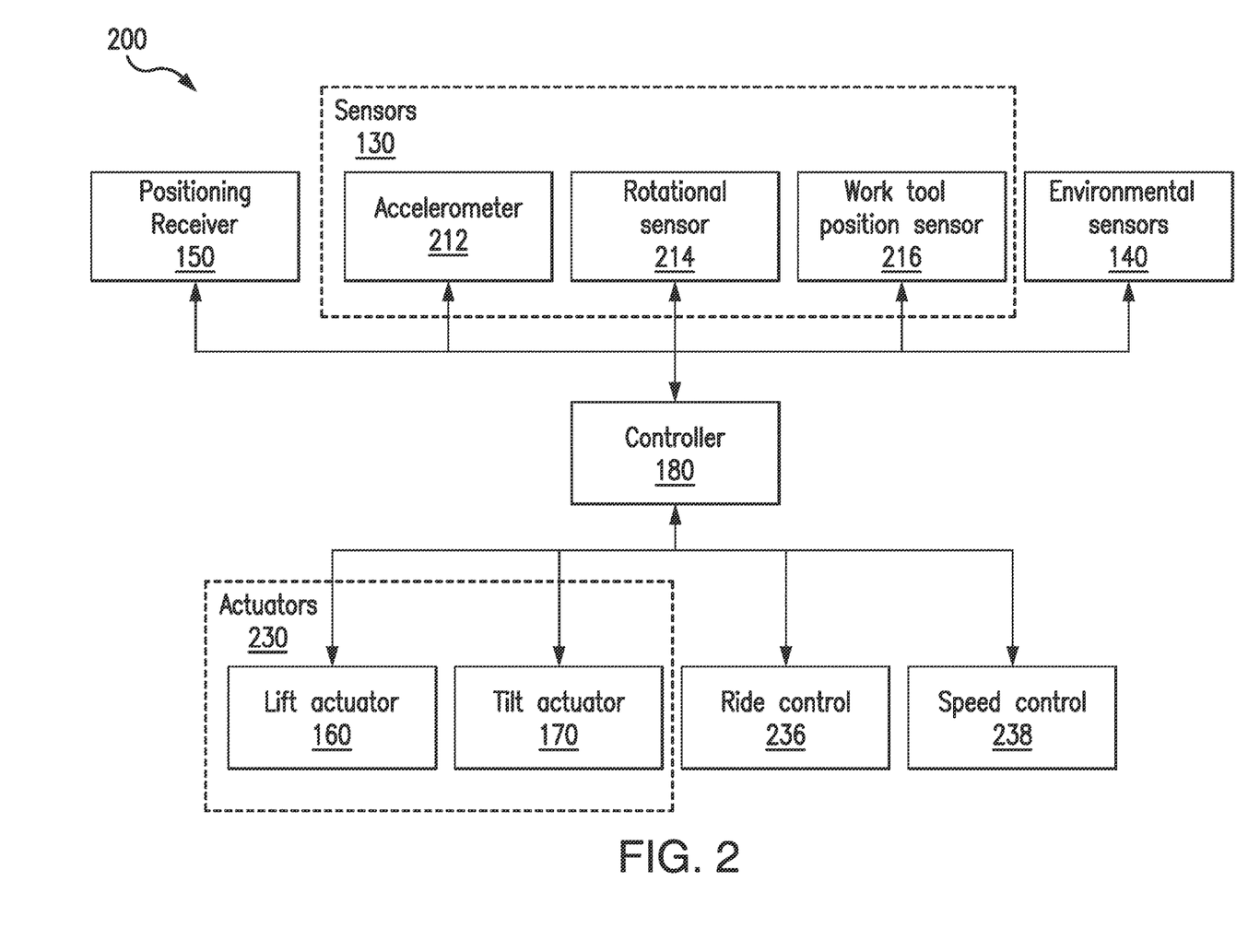
FIG. 2 depicts a system for automatically adjusting parameters on a semi-autonomous machine in accordance with one or more embodiments.

FIG. 2 depicts a system 200 for automatically adjusting parameters on an at least semi-autonomous machine (for example, CTL 100). The machine may be deployed at a worksite that includes rough terrain that can increase the likelihood of damaging a transported load is adjustments are not made to parameters during the operation of the machine.

The system 200 may include plurality of sensors 130. These sensors 130 may include an accelerometer 212, a rotational sensor 214, a work tool position sensor 216 that measures the tilt and the level of the work tool, in this case, the lifting tool, and the like. The system 200 may also include environmental sensors 140.

The accelerometer 212 is configured to measure linear acceleration of the machine in at least one direction. For example, acceleration may be measured along a longitudinal axis of the machine that runs from front to back. The accelerometer 212 may measure linear acceleration along more than one direction. The directions may be mutually orthogonal. For example, the accelerometer 212 may measure acceleration along a transverse axis oriented in a left-to-right direction of the machine and/or along a vertical axis oriented in a bottom-to-top direction of the machine. A separate accelerometer may be used for each axis, or accelerometer 212 may be a multi-axis (multi-directional) accelerometer.

The rotational sensor 214 is configured to measure rotation and/or rate of rotation about at least one axis. In one or more embodiments, the axes may be the same as those used with accelerometer 212, though using the same set of axis is not required. Further, the axes may intersect at a single point, that is, an origin, that is defined to be the center of gravity of the machine. The axes may be mutually orthogonal. The rotational sensor 214 may include one or more gyroscopes. The rotational sensor 214 may measure rotations and/or rates of rotation around a transverse axis, referred to as pitch, around a longitudinal axis, referred to as roll, or along a vertical axis, referred to as yaw.

The accelerometer 212 and the rotational sensor 214 may be included in a single package and referred to as an inertial measurement unit (IMU). An IMU may also include other sensors like one or more magnetometers used to measure the strength of the local magnetic field along one or more axes.

The plurality of sensors 130 may also include a work tool position sensor 216 that is configured to measure the level of the lifting tool (bucket, forks, and the like) relative to a plane of reference on the machine. The plane of reference is fixed with respect to the machine (loader, loading machine; for example, a CTL) so that the level of the lifting tool may vary with respect to the ground over which the machine is transporting the load.

The work tool position sensor 216 may further be configured to measure the tilt (that is, a tilt angle) relative to a plane of reference on the machine. The plane of reference for the tilt sensor may be the same as the one used for the level sensor, or it may be a different plane. However, the plane of reference is fixed with respect to the machine.

While the tilt and the level of the lifting tool is sensed with respect to a plane fixed relative to the machine, one may determine tilt and level values with respect to another reference, for instance, the ground by using measurements acquired by other sensors like the accelerometer 212 and rotational sensor 214. A positioning system, discussed below, may also provide additional measurements needed to change to a plane of reference external to the machine.

The system 200 may also include a positioning receiver 150.

Referring again to FIG. 2, the system 200 includes a plurality of actuators 230 disposed on the machine. The actuators may include a lift actuator 160. The lift actuator 160 is configured to adjust the level of the lifting tool. The plurality of actuators 230 may also include a tilt actuator 170 that is configured to adjust the tilt of the lifting tool. By adjusting the level and the tilt of the lifting tool, loads may be transported more securely from a loading location to a target location.

The machine 100 has a control system that may include a series of systems, a controller, and a plurality of sensors. A ride control system 236 may be enabled and disabled by the controller 180. The ride control system is configured, when enabled, to increase a level of suspension of the lifting tool. The increased level of suspension provides a smoother rider for cargo being transported by reducing forces exerted on the cargo and the associated accelerations.

Ride control may provide an added level of suspension for the lifting tool for operating at higher speeds in rough operating conditions. Ride control can allow the lifting tool to "float" when the machine travels over rough terrain. The increased level of suspension may allow for better retention of the load on the lifting tool. In one or more embodiments, ride control may be enabled at higher speeds and disabled at lower speeds according to predetermined speed thresholds. In other case, the decision to enable or disable ride control may take into account data from other sources like accelerometers and rotational sensors. The decision may also be affected by the phase of cycle operation in which the machine is presently.

The control system may also include a speed control system 238. The speed control system is configured to adjust the speed of the machine. The speed control system 238 may be used to keep the machine below a predetermined maximum speed. The speed control system 238 may also be used to vary the speed based on location of the machine in comparison to a map that indicates rough terrain or other reason to lower the speed. The speed control system 238 may be used to vary the speed in response to measurement data received from one or more of the plurality of sensors 130.

The system 200 includes a controller 180 disposed on the machine and operationally connected to the plurality of sensors 130, the positioning receiver 220, and the plurality of actuators 230.

The controller 180 is configured to acquire or access a map of the worksite, where the map includes terrain roughness data. The map may be previously stored on a non-transitory computer readable medium such as data storage on the machine, including in non-volatile memory supplied in the controller 180. The map may be provided to the controller through wired or wireless data communication. Such means of data communication include telephonic data, Internet, local area networks (LANs), wide area networks (WANs), USB, Bluetooth, IR, cellular communication, and the like. The map may be stored on a server at the worksite or offsite and downloaded to the machine. The machine may download the entire map or only a portion relevant to its operations. Either at the worksite or offsite, the map can be updated periodically or continuously by the machine and/or other machines operating at the worksite. The map stored on the machine may also be updated based on data from various sensors, such as accelerometers 212 and rotational sensors 214.

The controller 180 may also be configured to receive measurement data from the plurality of sensors 130. The controller 180 may be configured to determine the current location of the machine using position data from the positioning receiver 220. The controller 180 may also be configured to determine terrain roughness using accelerometer data, rotational sensor data, and/or the map in combination with the current location.

The controller 180 may be configured to adjust the speed based on terrain roughness by actuating the speed control system 238, with the limitation that the speed is less than or equal to a preset maximum speed, for example 5 miles per hour (mph) or 8 kilometers per hour (km/hr).

The controller 180 may be configured to determine a current phase in an operating cycle of the machine based on the current location of the machine, data from the level sensor, and/or data from the tilt sensor. The operating cycle may include loading a load (for example, picking up a pallet) at a loading location, transporting (or carrying) the load from the loading location to a target location, unloading the load (dropping off the pallet) at the target location, and returning from the target location to the loading location. The controller 180 may also be configured to adjust, based on the current phase, the level and the tilt by actuating the level actuator and the tilt actuator, respectively. The controller 180 may further be configured to enable or disable the ride control system based on the current phase.

The system 200 may also include at least one environmental sensor disposed on the machine and configured to sense the environment around the machine. Environmental sensors may include radar, LIDAR, machine vision, and ultrasound. The controller 180 may be further configured to operatively connect to one or more environmental sensor. Determining terrain roughness, discussed above, may also include using data from one or more environmental sensor.

In one or more embodiments, the operating cycle includes phases of loading the load from a loading location, transporting the load from the loading location to a target location, unloading the load at the target location, and returning from the target location to the loading location. Adjusting the level and tilt may include: (i) adjusting the level and the tilt to respective preset transport values when changing from the loading phase to the transport phase, and (ii) adjusting the level and the tilt to respective preset return values when changing from the unloading phase to the return phase.

The ride control system may be enabled as designed. In one embodiment, ride control may be enabled when transporting material and may be disabled when loading, unloading, and returning to a loading station in an unloaded configuration. Thus, ride control may be disabled when completing the carrying phase (transport phase) before unloading the load.

In one or more embodiments of the system 200, the controller 180 may be configured to update the map using terrain roughness based on data from at least one of the plurality of sensors 130 and/or the environmental sensors 140. For example, the accelerometer 212 may measure an acceleration that exceeds a threshold for indication of rough terrain. If the accelerometer 212 detects acceleration in more than one direction, then a separate threshold may be set for each direction. With a multi-directional accelerometer, a threshold indicating rough terrain may also be set for the magnitude of the acceleration, the acceleration being understood to be a vector quantity. In a similar fashion, the rotational sensor 214 may measure an angular velocity or acceleration that exceeds a rotational threshold. If the rotational sensor measures rotation about a plurality of axes, a threshold may be set for rotation about each axis. Measurements by the sensors 130, 140 may be received by the controller 180 where the measurements can be processed, compared to one or more thresholds, stored for future use, analyzed statistically, and the like. Statistical analysis may involve averaging, running averages, median, standard deviations, cluster analysis, principal component analysis, and the like. Analysis may also be tied to specific geographic locations, other sensor data, or other inputs.

Environmental sensors 140 may also be used to detect rough terrain. Environmental sensors such as radar, LIDAR, sonar, and the like may have the ability to look ahead and/or look around and anticipate rough terrain based on appropriate thresholds. The ability to look ahead may allow the machine 100 to adjust for anticipated rough terrain before the machine passes over the rough surface. Data from environmental sensors may be compared to measurements from accelerometers 212 and rotational sensors 214 for cross-calibration. Analyzed sensor 130, 140 data may be used to update the map of the worksite. The updated map may be stored and used locally on the machine, or it may be uploaded to a server at the worksite or offsite for use by other machines at the worksite. The map may be updated by one or more of the machines at the worksite or by data acquired by one or more of the machines.

Figure 3:
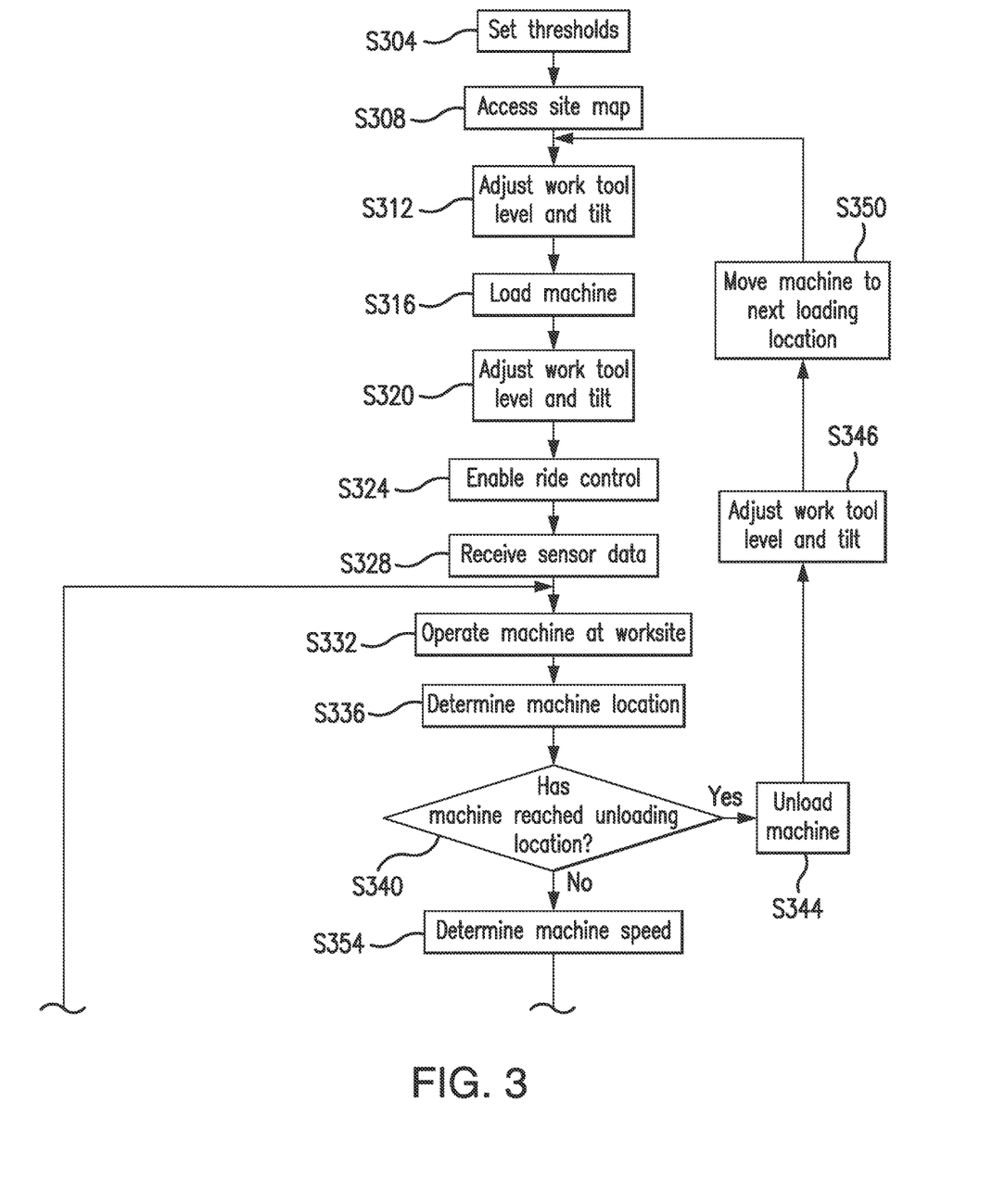
FIG. 3 presents a flowchart of a method of operating a machine at a worksite in accordance with one or more embodiments.

Referring now to FIG. 3, a method 300 of operating a machine at a worksite is presented. One or more embodiments of such a machine have been described above and will not be duplicated here. Details of the method may also be found discussed above.

In method 300, thresholds are set for both speed of the machine and determination of terrain roughness S304. A maximum speed for a given worksite may be determined in advance of work on the worksite and may be modified by observational data from accelerometers 212, rotational sensors 214, environmental sensors 140, as well as other input such as observed damage to transported cargo, for example, solar panels. A preset sub-maximum speed may also be set for use in areas of rough terrain. These areas of rough terrain may be determined by sensors, by current location of the machine compared to a map that includes terrain roughness data, by a combination of both determination methods, and the like. These thresholds may be stored in computer-readable non-transitory memory that is accessible to the controller.

The controller may access a worksite map S308. The map includes terrain roughness data. The map may have been previously stored on the machine, uploaded through a wired or wireless connection to a storage device, or accessed in some other way. The controller may access the entire map or only a portion of the map as required by the machine. The map may contain may be updated by the current machine. Additionally, the map may receive updates regarding rough terrain and other features of note such as obstacles from other machines at the worksite, either directly or through a server that maintains and updates the map of the worksite.

As the machine prepared to receive a load of cargo, for example, a pallet of solar panels, the controller may adjust the work tool position by using actuators to adjust the level and the tile as required to pick up the load S312. This step may be performed by an operator or may be performed autonomously by the machine by making use of the location of the machine. With the work tool position prepared for loading, the machine is loaded S316.

After the machine is loaded, the controller autonomously adjusts the level and tilt of the work tool (lifting tool) for the transportation phase of the operation S316. If the machine includes a ride control system, ride control is enabled to improve the suspension for the lifting arms and the cargo load S324.

The controller 180 receives sensor data (measurements) from the accelerometer 212, the rotational sensor 214, the environmental sensors 140, and the like S328.

The machine then proceeds to transport the cargo through the worksite to the target location S332. During the transportation phase, the position receiver receives signals from a plurality of positioning system transmitters that enables the position receiver and/or the controller to monitor the location of the machine in real-time S336. Using the map and the current location possibly with other information such as current speed and direction of travel, the controller continuously evaluates received sensor data to determine if rough terrain is being or is about to be encountered.

As the position of the machine is monitored, the controller determines if the machine has reached the target location for unloading S340. If the machine has arrived at the unloading location, the machine unloads the cargo S344. Unloading may be performed under the control of an operator or autonomously by the machine. After the load has been delivered, the work tool level and tilt are adjusted to predetermined positions for traveling without a load S346. The machine then returns at maximum speed to the loading location to pick up the next load S350.

If at S340 the controller determines that the machine has not arrived at the unloading location, the controller determines the machine speed based on terrain roughness S354. If the controller determines that the machine is in an excessive roughness zone based on the map S358, the speed control system reduces the speed of the machine S362. The reduced speed may be a predetermined speed for use in rough terrain, or it may be set interactively, reducing the speed until sensor thresholds such as those for the accelerometer and the rotational sensor are not being exceeded. Further, the reduction in speed may be determined in part by the speed of the machine. For example, when speed reduction is necessary, the speed may be reduced by a set fraction of the present speed. In another embodiment, the fractional speed reduction may be determined by the current speed. In other words, at a high speed, the speed may be reduced by 40 percent, while at a low speed, the speed may be reduced by 20 percent. The actual percentages are purely exemplary and may be greater or lower for each speed.

In another embodiment, the rate of speed reduction at S362 may be determined by the manner in which the rough terrain was determined. If the rough terrain was determined using the machine's location and the map, deceleration may occur early and more slowly. However, if sensors such as the accelerometer and/or the rotational sensor determines that the machine has presently entered rough terrain, reduction of speed may need to occur more rapidly to avoid the potentially high accelerations (and, therefore, forces) exerted on the load (such as solar panels).

If the machine is not in an excessive roughness zone as indicated by the map, the terrain roughness is determined for the present location using data from sensors like accelerometers, rotational sensors, environmental sensors, and the like S374. If the terrain exceeds a terrain roughness threshold S376, the worksite map is updated S380. The terrain roughness threshold may have been previously access from data storage in the machine, a portable data storage device, or through a wired or wireless connection to an external processor or data storage. Updating may include updating the machine's map, but it may also include updating the worksite map on a server that may be located at the worksite or offsite. Alternatively, updated maps may be communicated directly between machines at the worksite. In addition to updating the map, the machine reduces its speed as discussed above S362.

If at S376 the terrain roughness does not exceed the threshold, the workflow returns to S332.

When the machine has reduced its speed based on terrain roughness, the controller may evaluate whether the machine has exited the excessive roughness zone S366. This evaluation may be based on machine location in relation to the map or it may be with respect to sensor data. If the excessive roughness zone has been exited, the machine's speed may be increased to the desired value S370 and the workflow returns to S332. If the excessive roughness zone has not been exited S366, the workflow returns to S332.

In one or more embodiments of the present disclosure, an at least semi-autonomous machine is configured to operate at a worksite and includes a lifting tool configured to lift and/or tilt a load and a system for automatically adjusting parameters on the machine. The system has been discussed above and will not be duplicated here.

INDUSTRIAL APPLICABILITY

The industrial applicability of the systems, methods, and machines described herein will be readily appreciated from the foregoing discussion. The foregoing discussion is applicable to systems, methods, and machines for at least industrial worksites, particularly when rough terrain are present.

Figure 4:
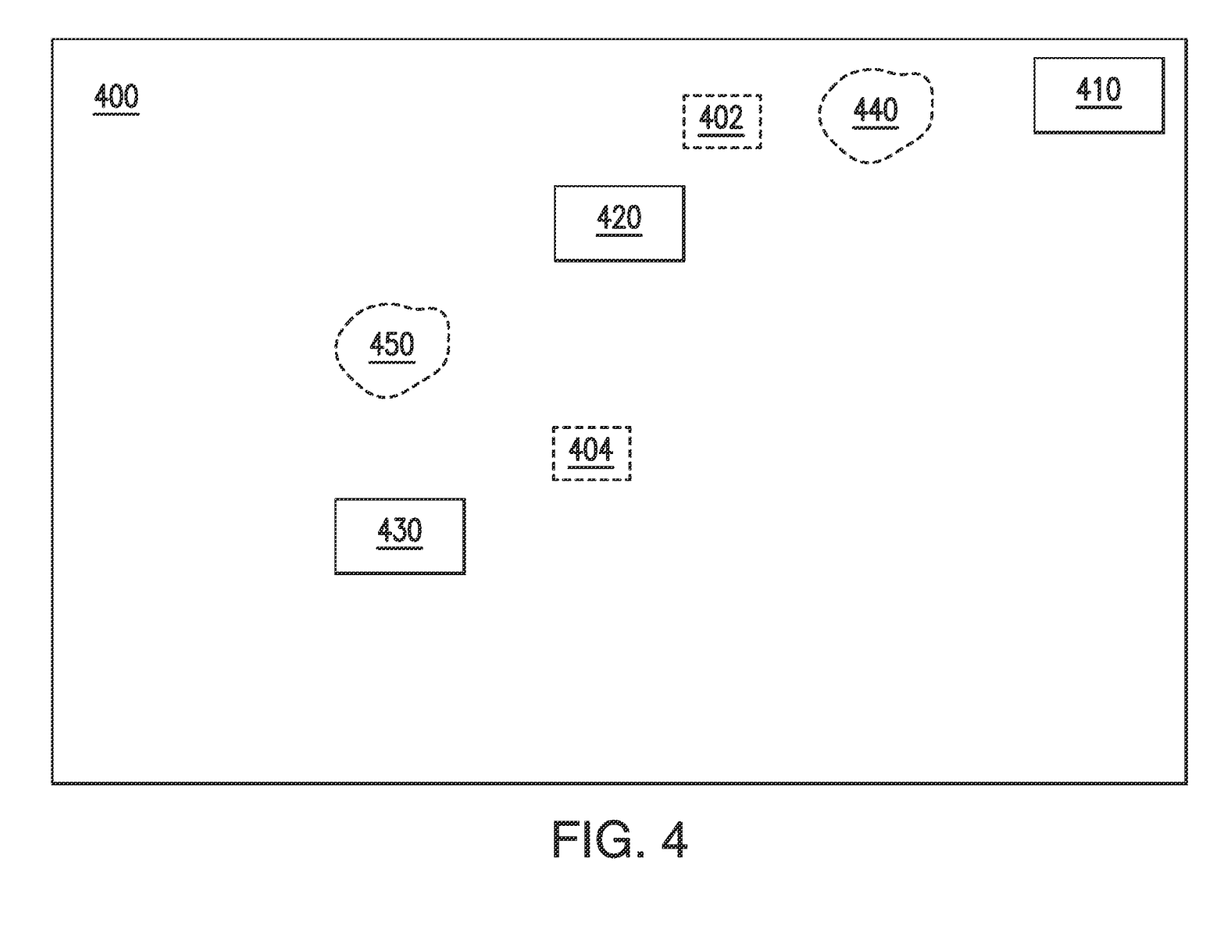
FIG. 4 depicts an exemplary worksite using a semi-autonomous machine in accordance with one or more embodiments.

Referring to FIG. 4, a worksite 400 may require loading machines (loaders, CTLs, and the like) 402, 404 to load and transport loads (for example, pallets of solar panels) from a loading location 410 to target locations 420, 430. The worksite 400 may include sections of rough terrain 440, 450 where risk of damage to the load is increased. The use of at least semi-autonomous machines that automatically adjust parameters based on external conditions (for example, rough terrain) and phase of operations cycle can reduce damage to transported materials, thus reducing installation costs.

It will be appreciated that the foregoing description provides examples of the disclosed system and technique. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by this disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for adjusting parameters on a machine that operates at least semi-autonomously at a worksite and comprises a lifting tool configured to lift and/or tilt a load, the system comprising:
   a plurality of sensors disposed on the machine, the plurality of sensors comprising:
      an accelerometer configured to measure linear acceleration of the machine in at least one direction; and
      a rotational sensor configured to measure rotation and/or rate of rotation of the machine about at least one axis;
   a positioning receiver disposed on the machine and configured to receive positioning signals from a positioning system;
   a plurality of actuators disposed on the machine, the plurality of actuators comprising:
      a level actuator configured to adjust a level of the lifting tool;
      a tilt actuator configured to adjust a tilt of the lifting tool; and
      a speed control system configured to adjust a speed of the machine; and
   a controller disposed on the machine and configured to:
      access a terrain roughness threshold;
      access a map of the worksite, the map comprising a terrain roughness data;
      receive measurement data from at least one of the accelerometer and the rotational sensor;
      determine, using position data from the positioning receiver, a current location of the machine;
      determine a terrain roughness using at least one of accelerometer data, rotational sensor data, and the map combined with the current location;
      determine whether the terrain roughness exceeds the terrain roughness threshold;
      determine whether the machine is in a load-carrying phase of machine operation at the worksite in an operating cycle of the machine based on the current location of the machine, level and/or tilt data from a work tool position sensor;
      the speed control system reduces the speed of the machine when the terrain roughness exceeds the terrain roughness threshold and the machine is in the load-carrying phase, wherein the speed of the machine is reduced at a first rate of speed reduction when the terrain roughness is determined by the map combined with the current location; and
      the speed control system does not reduce the speed of the machine when the terrain roughness exceeds the terrain roughness threshold and the machine is not carrying a load.

2. The system of claim 1, wherein the controller is configured to adjust, based on a current phase, the level and the tilt by actuating the level actuator and the tilt actuator, respectively.

3. The system of claim 1, wherein the controller is configured to enable or disable, based on a current phase, a ride control system.

4. The system of claim 1, wherein accessing the map comprises loading the map stored on the machine or downloading a map shared and updated by other machines at the worksite.

5. The system of claim 1, wherein the work tool position sensor is configured to measure the level and the tilt of the lifting tool relative to a plane of reference on the machine.

6. The system of claim 1, wherein the plurality of actuators further comprises a ride control system configured, when enabled, to increase a level of suspension of the lifting tool.

7. The system of claim 1, the system further comprising:
at least one environmental sensor disposed on the machine and configured to sense the environment around the machine, the at least one environmental sensor comprising radar, LIDAR, machine vision, and/or ultrasound,
wherein the controller is further configured to operatively connect to the at least one environmental sensor, and
wherein determining the terrain roughness includes using data from the at least one environmental sensor.

8. The system of claim 1, wherein:
the operating cycle comprises a carrying phase when carrying a load, the carrying phase including operating at a reduced speed, and a return phase when not carrying a load and not reducing speed when the terrain roughness threshold is exceeded, and
adjusting the level and the tilt comprises;
adjusting the level and the tilt to respective preset transport values when changing from a loading phase to a transport phase; and
adjusting the level and the tilt to respective preset return values when changing from an unloading phase to a return phase.

9. The system of claim 8, wherein:
ride control is enabled when in the carrying phase, and
ride control is disabled when completing the carrying phase before unloading the load.

10. The system of claim 1, wherein the controller is further configured to update the map using the terrain roughness based on data from at least one of the plurality of sensors.

11. The system of claim 1, wherein determining the terrain roughness uses the map combined with the current location and at least one of accelerometer data and rotational sensor data.

12. The system of claim 1, wherein the speed of the machine is reduced at a second rate of speed reduction when the terrain roughness is determined by accelerometer data, or when the terrain roughness is determined by rotational sensor data, or a combination thereof, wherein the second rate of speed reduction is greater than the first rate of speed reduction.

13. A method of operating a machine at a worksite, the machine comprising:
a lifting tool configured to lift and tilt a load;
a system for automatically adjusting parameters on the machine, the system comprising:
a plurality of sensors comprising:
an accelerometer configured to measure linear acceleration of the machine in at least one direction;
a rotational sensor configured to measure rotation and/or rate of rotation of the machine about at least one axis:
a level sensor configured to measure a level of the lifting tool relative to a plane of reference on the machine;
a tilt sensor configured to measure a tilt of the lifting tool relative to the plane of reference;
a positioning receiver configured to receive positioning signals from a plurality of transmitters of at least one positioning system;
a plurality of actuators disposed on the machine, the plurality of actuators comprising:
a level actuator configured to adjust the level of the lifting tool;
a tilt actuator configured to adjust the tilt of the lifting tool;
a ride control system configured, when enabled, to increase a level of suspension of the machine;
a speed control system configured to adjust a speed of the machine;
a controller operationally connected to the plurality of sensors, the positioning receiver, and the plurality of actuators;
the method comprising:
accessing a map of the worksite, the map comprising a terrain roughness data;
receiving measurement data from the plurality of sensors;
determining, using position data from the positioning receiver, a current location of the machine;
determining a terrain roughness using accelerometer data, rotational sensor data, and/or the map combined with the current location;
adjusting the speed based on the terrain roughness by actuating the speed control system, wherein the speed of the machine is reduced at a first rate of speed reduction when the terrain roughness, determined by the map combined with the current location, exceeds a terrain roughness threshold and the machine is carrying a load, wherein the speed is less than or equal to a preset maximum speed, and not adjusting the speed when the terrain roughness exceeds a terrain roughness threshold and the machine is not carrying a load;
determining a current phase in an operating cycle of the machine based on the current location of the machine, data from the level sensor, and/or data from the tilt sensor;
adjusting, based on the current phase, the level and the tilt by actuating the level actuator and the tilt actuator, respectively; and
enabling or disabling, based on the current phase, the ride control system.

14. The method of claim 13, wherein determining the terrain roughness includes using data from at least one environmental sensor, and wherein the at least one environmental sensor, comprising radar, LIDAR, machine vision, and/or ultrasound, is disposed on the machine and is configured to sense an environment around the machine.

15. The method of claim 13, wherein:
the operating cycle comprises phases of loading the load from a loading location, transporting the load from the loading location to a target location, unloading the load at the target location, and returning from the target location to the loading location, and
adjusting the level and tilt comprises:
adjusting the level and the tilt to respective preset transport values when changing from a loading phase to a transport phase; and
adjusting the level and the tilt to respective preset return values when changing from an unloading phase to a return phase.

16. The method of claim 13, wherein the speed of the machine is reduced at a second rate of speed reduction when the terrain roughness is determined by accelerometer data, or when the terrain roughness is determined by rotational sensor data, or a combination thereof, wherein the second rate of speed reduction is greater than the first rate of speed reduction.

17. An at least semi-autonomous machine configured to operate at a worksite and comprising a lifting tool configured to lift and/or tilt a load and a system for automatically adjusting parameters on the machine, the system comprising:
a plurality of sensors comprising:
an accelerometer configured to measure linear acceleration of the machine in at least one direction;
a rotational sensor configured to measure rotation and/or rate of rotation of the machine about at least one axis;
a level sensor configured to measure a level of the lifting tool relative to a plane of reference on the machine;
a tilt sensor configured to measure a tilt of the lifting tool relative to the plane of reference;
a positioning receiver configured to receive positioning signals from a plurality of transmitters of at least one positioning system;
a plurality of actuators disposed on the machine, the plurality of actuators comprising:
a level actuator configured to adjust the level of the lifting tool;
a tilt actuator configured to adjust the tilt of the lifting tool;
a ride control system configured, when enabled, to increase a level of suspension of the machine;
a speed control system configured to adjust a speed of the machine;
a controller operationally connected to the plurality of sensors, the positioning receiver, and the plurality of actuators, the controller being configured to:
access a map of the worksite, the map comprising a terrain roughness data;
receive measurement data from the plurality of sensors;
determine, using position data from the positioning receiver, a current location of the machine;
determine a terrain roughness using accelerometer data, rotational sensor data, and/or the map combined with the current location;
adjust the speed based on the terrain roughness by actuating the speed control system, wherein the speed of the machine is reduced at a first rate of speed reduction when the terrain roughness, determined by the map combined with the current location, exceeds a terrain roughness threshold and the machine is carrying a load, wherein the speed is less than or equal to a preset maximum speed, and not adjusting the speed when the terrain roughness exceeds a terrain roughness threshold and the machine is not carrying a load;
determine a current phase in an operating cycle of the machine based on the current location of the machine, data from the level sensor, and/or data from the tilt sensor;
adjust, based on the current phase, the level and the tilt by actuating the level actuator and the tilt actuator, respectively; and
enable or disable, based on the current phase, the ride control system.

18. The machine of claim 17, wherein the at least one positioning system comprises at least one of a local positioning system, a regional positioning system, or a global navigation satellite system.

19. The machine of claim 17, wherein the accelerometer is further configured to measure linear acceleration of the machine in a plurality of orthogonal directions and/or the rotational sensor is further configured to measure rotation and/or rate of rotation of the machine about a plurality of orthogonal axes.

20. The machine of claim 17, wherein accessing the map comprises loading the map stored on the machine or downloading a map shared and updated by other machines at the worksite.

21. The machine of claim 17, the machine further comprising:
at least one environmental sensor and configured to sense the environment around the machine, the at least one environmental sensor comprising radar, LIDAR, machine vision, and/or ultrasound,
wherein the controller is further configured to operatively connect to the at least one environmental sensor, and
wherein determining the terrain roughness includes using data from the at least one environmental sensor.

22. The machine of claim 17, wherein:
the operating cycle comprises phases of loading the load from a loading location, transporting the load from the loading location to a target area, unloading the load at the target area, and returning from the target area to the loading location, and
adjusting the level and the tilt comprises:
adjusting the level and the tilt to respective preset transport values when changing from a loading phase to a transport phase; and
adjusting the level and the tilt to respective preset return values when changing from an unloading phase to a return phase.

23. The machine of claim 22, wherein:
ride control in enabled when changing from the loading phase to the transporting phase and/or when changing from the unloading phase to the return phase, and
ride control is disabled when changing from the transporting phase to the unloading phase and/or when changing from the return phase to the loading phase.

24. The machine of claim 17, wherein the speed of the machine is reduced at a second rate of speed reduction when the terrain roughness is determined by accelerometer data, or when the terrain roughness is determined by rotational sensor data, or a combination thereof, wherein the second rate of speed reduction is greater than the first rate of speed reduction.

* * * * *